UNITED STATES PATENT OFFICE.

THEODORE G. SPRINGER, OF NEW YORK, N. Y.

PROCESS OF TREATING NATURAL GAS.

SPECIFICATION forming part of Letters Patent No. 370,358, dated September 20, 1887.

Application filed April 7, 1887. Serial No. 234,006. (No specimens.)

*To all whom it may concern:*

Be it known that I, THEODORE G. SPRINGER, a citizen of the United States, residing at New York city, in the county of New York and State of New York, have invented certain new and useful Improvements in Processes of Treating Natural Gas; and I do hereby declare the following to be a full, clear, and exact description of the invention, such as will enable others skilled in the art to which it appertains to make and use the same.

This invention relates to the process of treating natural gas to convert it into fixed illuminating-gas of the desired candle-power; and the object of the invention is to prevent the deposit and waste of the carbon contained in the natural gas, and to utilize such carbon in conjunction with steam, and thereby greatly increase the volume of gas produced; and a further object is to produce and add to the natural gas and carbureted hydrogen a sufficient volume of carbonic oxide to improve and whiten the light or flame of the burning-gas, since the blue flame of carbonic oxide neutralizes the yellow flame of rich carbureted hydrogen and produces a white flame of increased candle-power.

Natural gas contains, in addition to the large per cent. of light carbureted hydrogen, a valuable per cent. of hydrocarbon vapors. In carrying out my invention I utilize the carbon of these constituents by causing it to decompose steam and combine with the oxygen thereof in contact with heated refractory material.

In the treatment of natural gas for improving its quality it has been passed through a body of incandescent carbonaceous fuel, resulting in its destructive decomposition and the deposit of its carbon in the form of lamp-black or hard carbon, the gas thus being robbed of a valuable constituent, which was practically wasted. The remaining hydrogen was then carbureted and fixed to form an illuminating-gas. This gas, however, burned with a yellow flame and was apt to be smoky, and the method of treatment was wasteful and defective. In carrying out my invention I overcome these defects and secure more economical results, as follows: The natural gas is first passed, together with steam, preferably in excess—that is, in sufficient quantity to furnish two combining equivalents of oxygen to each combining equivalent of carbon contained in the natural gas—in contact with heated refractory material, such as fire-brick or red brick, by which the gas and steam are decomposed, resulting in the formation of carbonic acid, ($CO_2$,) while the hydrogen of both is set free. Now this mixture of hydrogen and carbonic acid may be passed through the bed of highly-heated fuel without deposit or loss of its carbon. On the contrary, the carbonic acid, under the increased temperature and in the presence of the fuel, takes up with another equivalent of carbon and is converted into carbonic oxide (CO)—a valuable constituent of heating and illuminating gas. The commingled hydrogen and carbonic oxide are now in the best state for carburation with enriching hydrocarbon oil and subsequent fixing to form a superior illuminating-gas.

For practicing my invention I preferably connect two of my well-known cupola gas-generators together at the base or ash-pits, each cupola having a fuel-chamber at the base and a superheating and fixing chamber filled with refractory brick-work at the top, and being provided with suitable supply-pipes for air, steam, gas, and gas-take-off pipes, &c. The beds of fuel being ignited, they are blasted with air, and the resulting gaseous products are burned in the superheating and fixing chambers, imparting their heat to the contained refractory brick-work. The beds of fuel having been heated to incandescence and the superheating and fixing chambers heated to the desired decomposing temperature, the air-blasts are shut off and the chambers tightly closed. Natural gas and steam, the latter being preferably in excess, are now admitted to and decomposed in one of the superheating and fixing chambers, setting the hydrogen of the gas and steam free, while the oxygen, being in suitable proportion, combines with the carbon of the natural gas to form carbonic acid, ($CO_2$.) These commingled gases and any remaining undecomposed steam are now passed through one or both beds of incandescent fuel, by which the carbonic acid is converted into carbonic oxide and the steam is decomposed into water-gas. The gas is now in the condition of a good heating or fuel gas, and may, if desired, be passed off for such purpose; but if illuminating-gas is desired, the hot mixture of hydrogen and carbonic oxide is carbureted with hydrocarbon-oil vapor, and is combined and fixed by passage through the second chamber, containing heated refractory material, to form an illuminating-gas of the desired candle-power. The above-mentioned mixture of hydrogen and carbonic acid and steam that may be present may be passed for conversion down through the first bed of fuel, then up through the second bed to insure perfect conversion and decomposition, when necessary, or through only one of the bodies of fuel when sufficient, either one of which may be used for the purpose by a proper arrangement of connecting-pipes.

In case the volume of steam which reacts with the natural gas in the preheating-chamber is less than is required to furnish oxygen sufficient for conversion of the carbon into carbonic acid, by so much will the hydrocarbon remain undecomposed, or else take form as carbonic oxide. The unconverted hydrocarbon, if introduced as such into the incandescent fuel, would be destructively decomposed and its carbon deposited, which this invention seeks to avoid, whereas, if carbonic oxide results from the insufficient steam with which the natural gas reacts in the preheating or converting chamber, the production of such carbonic oxide must render latent much more heat than is requisite in decomposition to carbonic acid, so that a higher heat is required in the converting-chamber; or, on the other hand, too rapid cooling results. Besides this, no advantage would result from passing carbonic oxide through the incandescent fuel of the cupola.

The formation of carbonic acid releases the same volume of free hydrogen in the reaction which takes place in the converting-chamber, so that on this account and the equally important one of a lower temperature in the converting-chamber necessary to the carbonic-acid reaction the presence of steam therein more or less in excess of that which will furnish oxygen sufficient for the carbonic-acid reaction is much to be preferred, in order to secure the most economical results. In case a portion of the steam escapes decomposition in the primary converting-chamber, it is decomposed into water-gas in the bed of fuel.

Having described my invention, what I claim, and desire to secure by Letters Patent, is—

1. The process of treating natural gas to convert it into fixed gas of increased volume, which consists in subjecting the natural gas, together with steam, to contact with heated refractory material in such proportion that the oxygen of the steam will be in excess of the carbon of natural gas in the heated chamber, whereby the oxygen will combine with the carbon of the natural gas, producing carbonic-acid gas, and liberate the hydrogen of the natural gas and steam, then passing the hydrogen and carbonic-acid gas, together with any undecomposed steam, directly through a body of incandescent carbon to convert the carbonic acid into carbonic-oxide gas and the steam into water-gas, whereby the carbon of the natural gas is utilized and the volume of gas is largely increased.

2. The process of converting natural gas into an illuminating-gas of any desired candle-power, which consists in bringing natural gas into contact with highly-heated refractory material and at the same time bringing steam into contact with the same highly-heated refractory material in such proportion that the oxygen of the steam will be in excess of the carbon in the heated chamber, whereby the carbon of the natural gas will combine with the oxygen of the steam, producing carbonic-acid gas and liberating the hydrogen of the natural gas and steam, then passing the hydrogen and carbonic-acid gas, together with any undecomposed steam, through a body of incandescent carbon to convert the carbonic acid into carbonic-oxide gas and the steam into water-gas, then carbureting the mixed gases and fixing them in a heated chamber.

3. The process of converting natural gas into an illuminating-gas of any desired candle-power, which consists in heating two bodies of carbonaceous fuel to a state of incandescence by air-blasts, burning with air the gaseous products and storing the heat in two bodies of refractory material, then decomposing natural gas and steam in one of the bodies of heated refractory material, producing carbonic-acid gas and hydrogen, then passing the hydrogen and carbonic-acid gas through one of the bodies of incandescent fuel to convert the carbonic-acid gas into carbonic-oxide gas, then passing the mixed gases through the other body of incandescent fuel to insure perfect conversion of the carbonic-acid gas into carbonic oxide, then carbureting the mixed gases and passing them through the other body of heated refractory material to fix them and produce a fine illuminating-gas.

In testimony whereof I affix my signature in presence of two witnesses.

THEODORE G. SPRINGER.

Witnesses:
M. J. KIBBE,
N. A. McCLARY.